United States Patent [19]

Piazza

[11] Patent Number: 5,505,574
[45] Date of Patent: Apr. 9, 1996

[54] STOREHOUSE HAVING FRAMES MOVABLE WITH AN ORTHOGONAL TRANSLATION FOR ARTICLES OF A PLANAR SHAPE

[76] Inventor: Antonio Piazza, Via Tuzzi, 87, Schio (Vicenza), Italy

[21] Appl. No.: 123,287

[22] Filed: Sep. 17, 1993

[30]  Foreign Application Priority Data

Sep. 18, 1992 [IT] Italy .................................. VI920135

[51] Int. Cl.$^6$ .................................................. A47B 53/00
[52] U.S. Cl. .............................. 414/267; 211/41; 211/162
[58] Field of Search ...................... 414/267, 331, 414/798.9; 410/32, 43; 312/183, 184; 211/1.51, 1.57, 41, 71, 72, 73, 40, 122, 162

[56] References Cited

U.S. PATENT DOCUMENTS

| | | | |
|---|---|---|---|
| 1,405,757 | 2/1922 | Clark | 410/32 |
| 2,726,128 | 12/1955 | Hazel, Jr. | 312/184 |
| 3,301,405 | 1/1967 | Turney | 410/32 X |
| 3,312,515 | 4/1967 | Barker | 312/184 X |
| 3,589,525 | 6/1971 | Allen | 211/162 |
| 3,737,047 | 6/1973 | Ruth | 211/162 |
| 4,303,286 | 12/1981 | McClellan | 312/184 X |
| 4,307,922 | 12/1981 | Rhodes, Jr. | 211/1.57 X |
| 5,072,835 | 12/1991 | Price, Jr. et al. | 211/40 |

FOREIGN PATENT DOCUMENTS

| | | | |
|---|---|---|---|
| 2117922 | 10/1971 | Germany | 211/1.57 |
| 2215446 | 10/1972 | Germany | 211/1.57 |
| 1079471 | 8/1967 | United Kingdom | 211/1.57 |

*Primary Examiner*—William E. Terrell
*Assistant Examiner*—Stephen Gordon
*Attorney, Agent, or Firm*—Bucknam and Archer

[57] ABSTRACT

The storehouse consists of a plurality of frames (1) which are transversally movable and are supported by a base (2), which has beams. The storehouse is also provided with guiding wheels (4) which permit the displacement in the transversal direction of one group of frames with respect to the remainder for the purpose of providing a space through which some articles may be stored or removed. The storehouse is also provided with some eccentric pins and revolving rollers for the purpose of avoiding turnover at the time when the frames operate in an inclined position, which turnover would be dangerous to the working people.

3 Claims, 6 Drawing Sheets

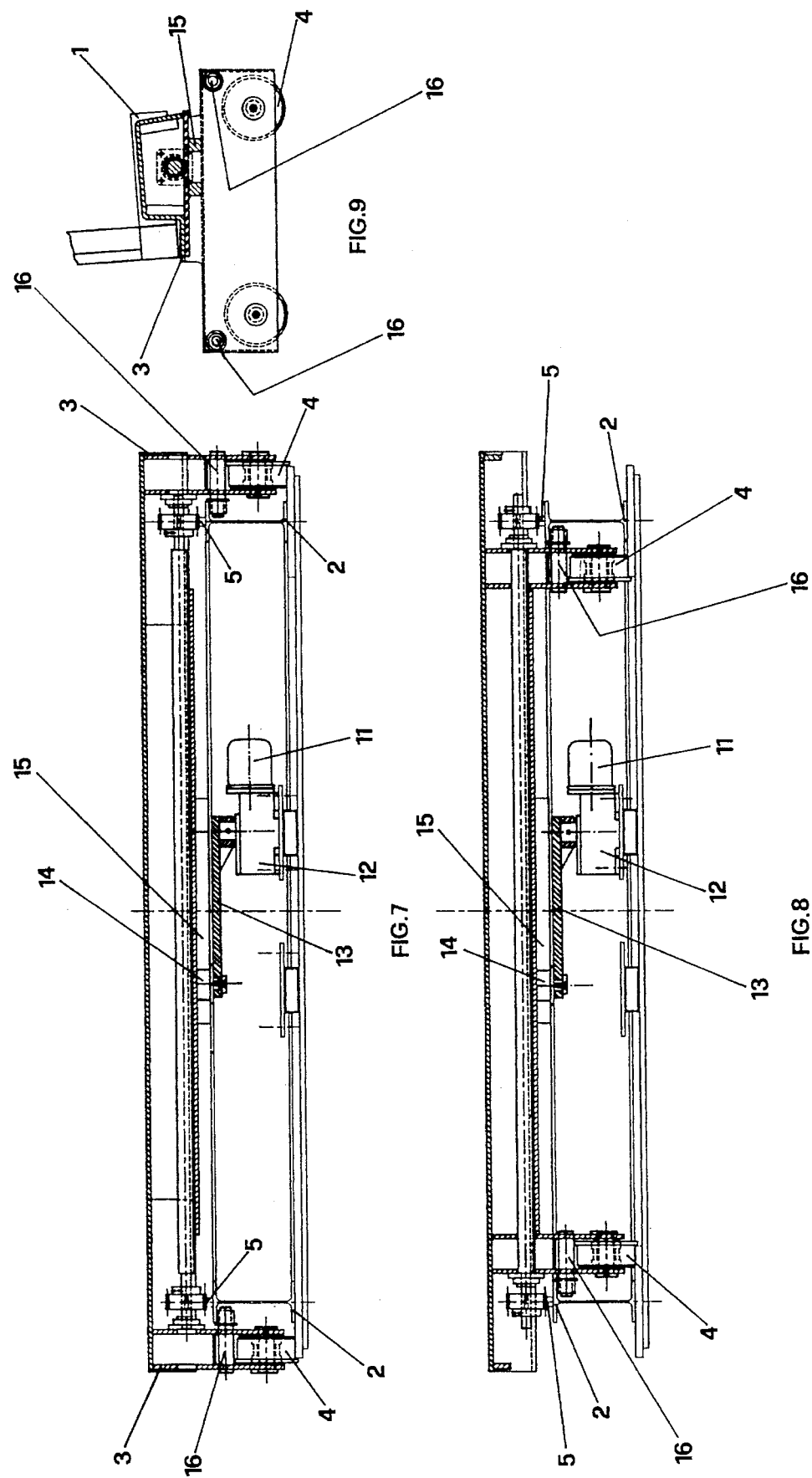

STOREHOUSE HAVING FRAMES MOVABLE WITH AN ORTHOGONAL TRANSLATION FOR ARTICLES OF A PLANAR SHAPE

FIELD OF THE INVENTION

The present invention relates to a storehouse and particularly to a storehouse with movable frames for products of a planar shape such as glass slabs or slabs made of other material. However, by particular adjustments, the storehouse can be suitable also for movable frames for objects of different shape.

SUMMARY OF THE INVENTION

The main novel feature of the invention resides in providing the storehouse with a supporting structure which permits a translation of the individual movable frames in the orthogonal direction for the purpose of removing or inserting the objects which are stored in the individual movable frames.

Obviously suitable safety devices must be provided for the purpose of avoiding in an absolute manner, the possibility of movements which could be dangerous for the people working in the storehouse.

BRIEF DESCRIPTION OF THE DRAWINGS

The invention will be illustrated hereinbelow in more detail with reference to the accompanying drawings of which;

FIG. 7 illustrates a front view in cross section of a further embodiment of the invention having external wheels.

FIG. 8 illustrates the same as above with internal wheels.

FIG. 9 illustrates a side view of the carriage of FIGS. 7 and 8.

As shown in FIGS. 1 and 3, the storehouse of the invention comprises a series of frames which are movable in the orthogonal direction with respect to the loading and unloading movement of the products being stored, along the supporting structure (2) preferably of rectangular shape comprised of two longitudinal parallel beams interconnected by two transverse beams wherein all of the beams form a single unitary body fixed to the floor. In this embodiment of the invention each movable frame (1) is fixed to carriage (3) provided with wheels (4) which are movable along the sides of the longitudinal profiles of the supporting structure (2) being provided with uprights. Along the uprights there may be eventually provided racks (5) which are placed above or below the beam of the supporting structure (2). Toothed wheels (6) engage with the racks (5), the toothed wheels being integral with the carriage (3), the later being integral with the movable frame (1) for the purpose of maintaining the frame properly guided during the displacement.

Figure 1:
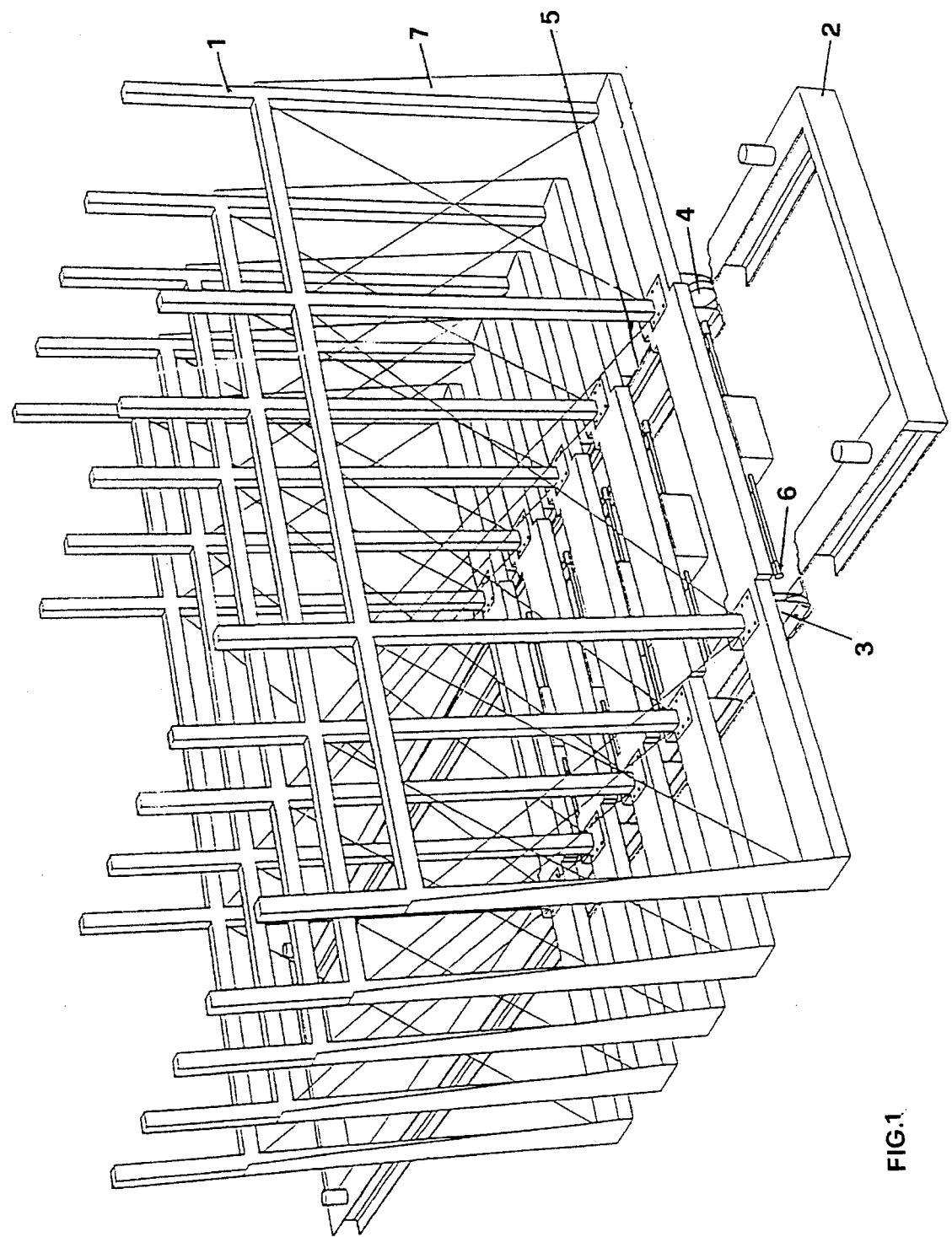
FIG. 1 illustrates a perspective view of the storehouse having movable frames with a first guiding assembly having either manual control or being motorized along racks which are fixed to the lower frames.
Figure 2:
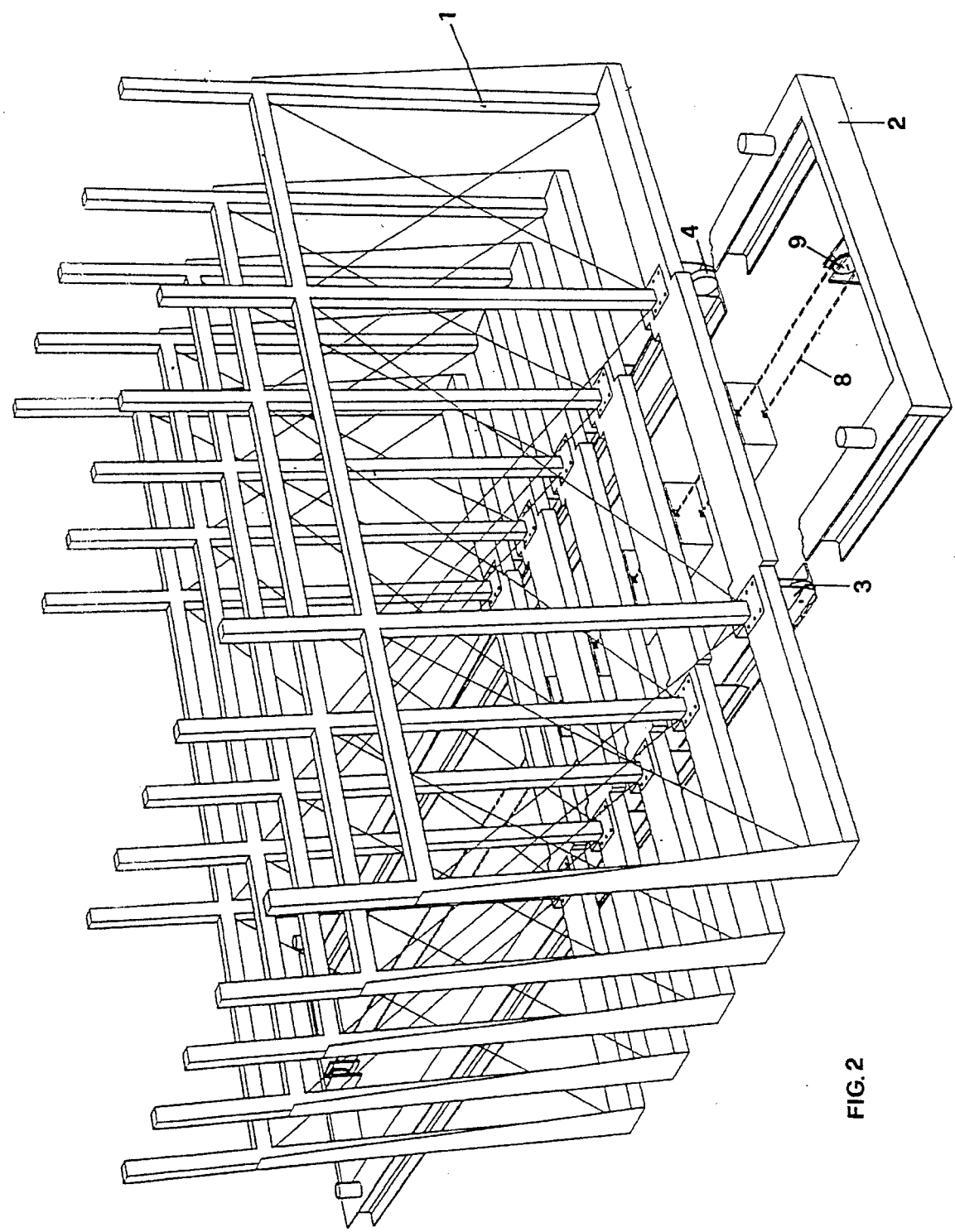
FIG. 2 illustrates the storehouse with movable frames actuated by a control chain.

The coatings (7) which are disposed along the sides of each frame rigidify the entire structure and serve as a safety device since they may also be openable. In the particular embodiment shown in FIG. 2, the storehouse comprises also frames (1), the motion of which is controlled by one or more chains (8) depending upon the type of the carriages being displaced. The chains are supported by the toothed wheels (9) and are suitably motorized for the purpose of permitting the displacement of one group of frames with respect to the others so as to create a space which permits the removal or the introduction of the articles on the frame which has been set free.

Obviously a series of controls must be provided in order to allow these displacements.

Figure 3:
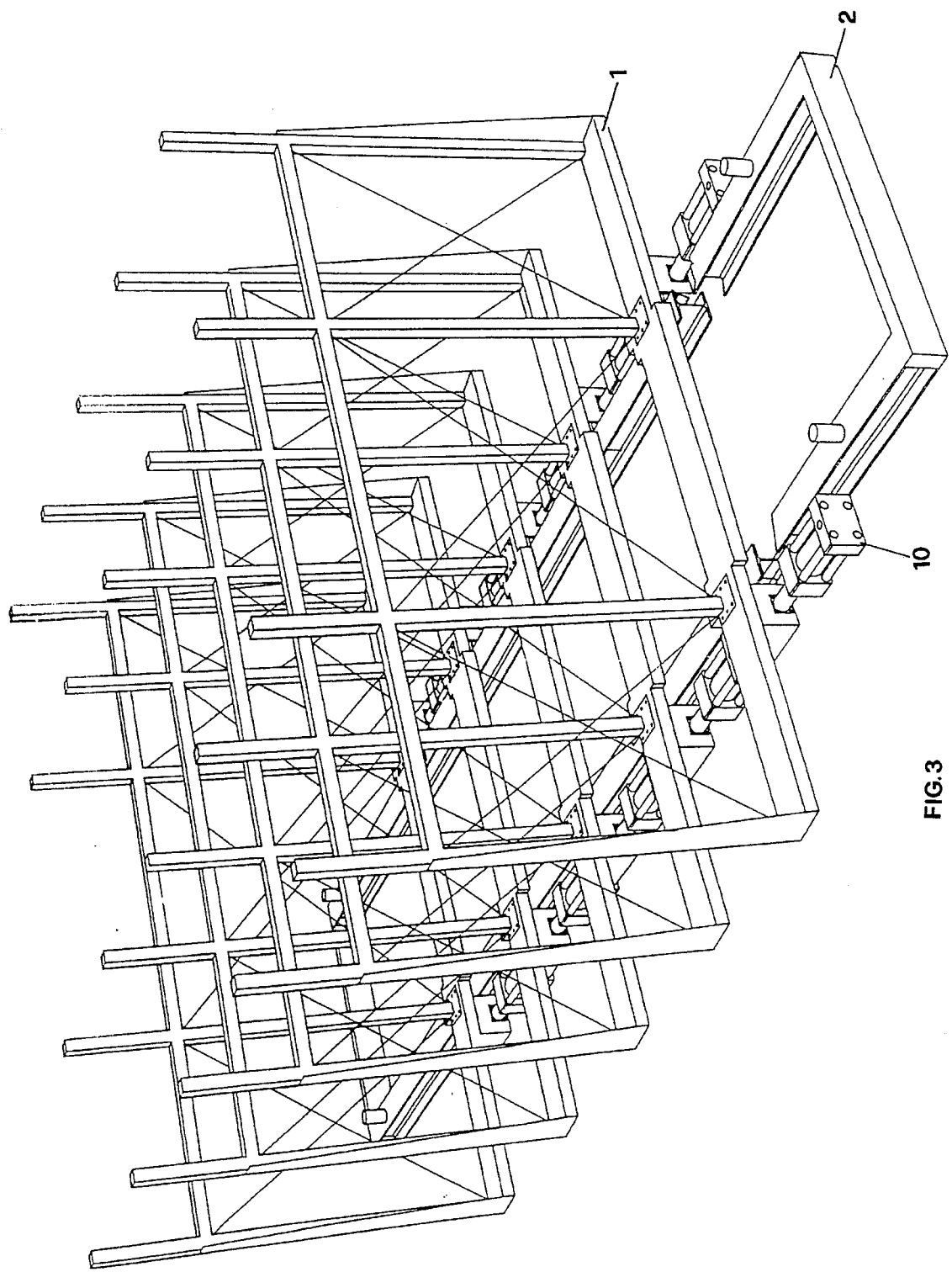
FIG. 3 illustrates the storehouse with the movable frames actuated by hydraulic or pneumatic control devices.
Figure 6:
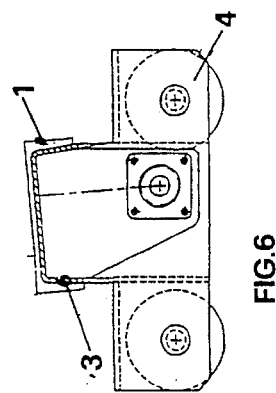
FIG. 6 illustrates a side view of the lower part of a guiding frame.

FIG. 3 shows the frames (1) being displaced by a plurality of hydraulic or pneumatic cylinders (10) one for each frame suitably controlled by means of a program which permits a series of the frames to be moved away with respect to the remainder of the frames in order to create the space for the introduction or the removal of materials. Depending upon the type of the loads to be displaced, a greater number of cylinders (10) with respect to the cylinders shown in these figures, may be provided. By way of example, some cylinders may also be disposed along the center line of the frames.

Figure 4:
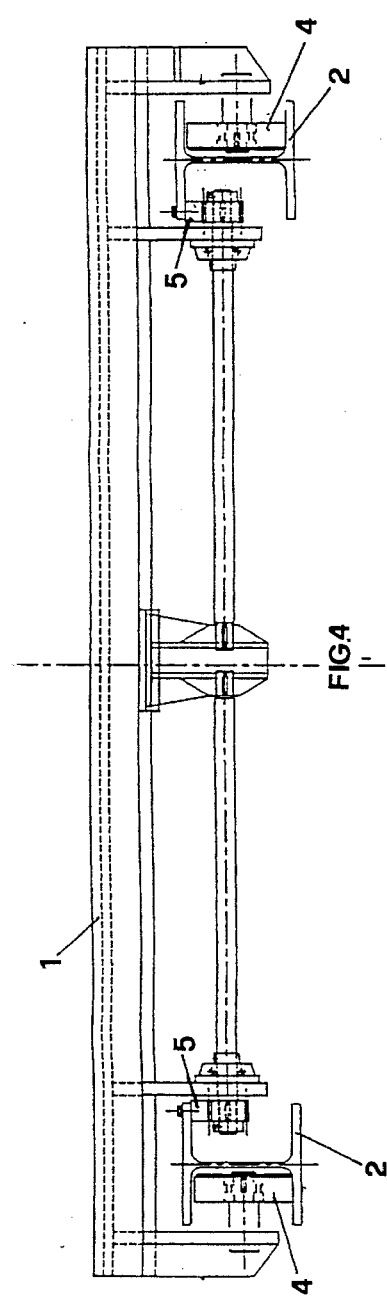
FIG. 4 is a front view of the lower part of a frame of the storehouse with rollers external to the guiding rails.

In the embodiment shown in FIG. 4, the wheels (4) mounted with the respective axis on the body of the carriage (3), which is integral with the structure of the beam, are disposed externally with respect to the parallel beams which belong to the supporting structure (2).

Figure 5:
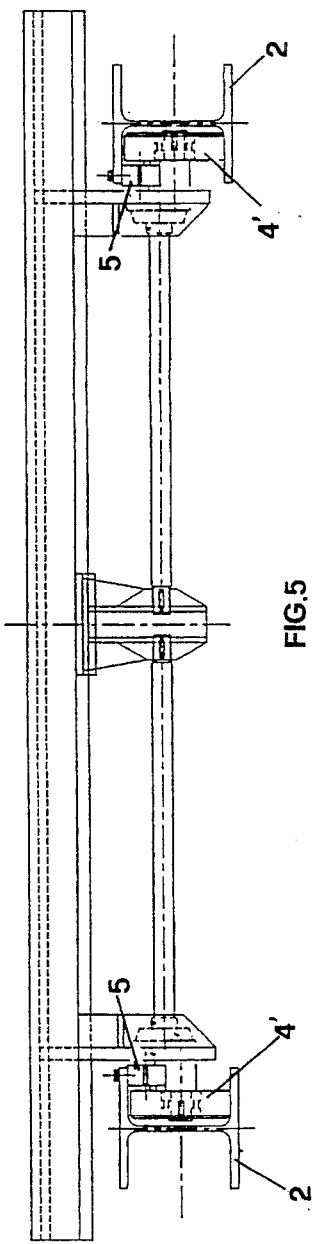
FIG. 5 illustrates another possible embodiment of the storehouse of the invention with guiding rollers which are internal with respect to the rails.

In the embodiment shown in FIG. 5, there is provided that the wheels (4') be disposed internally with respect to the beams which constitute the supporting structure 2. In both cases that is in the embodiments of FIGS. 4 and 5, the racks (5) are integral with respect to the upper or lower fins of the beams which are part of the supporting structure 2.

FIGS. 7 and 8 illustrate variations in the construction of the control device which comprises an electric motor (11), which by means of a reduction unit (12) actuates lever (13) which is keyed on roller (14). The roller rotates in the interior of slider (15) and causes the displacement of the carriage (3). In the embodiment of FIG. 7, the wheels (4) are disposed externally with respect to the supporting structure (2) while in the embodiment of FIG. 8 the same wheels (4) are disposed internally with respect to the supporting structure (2).

Figure 10:
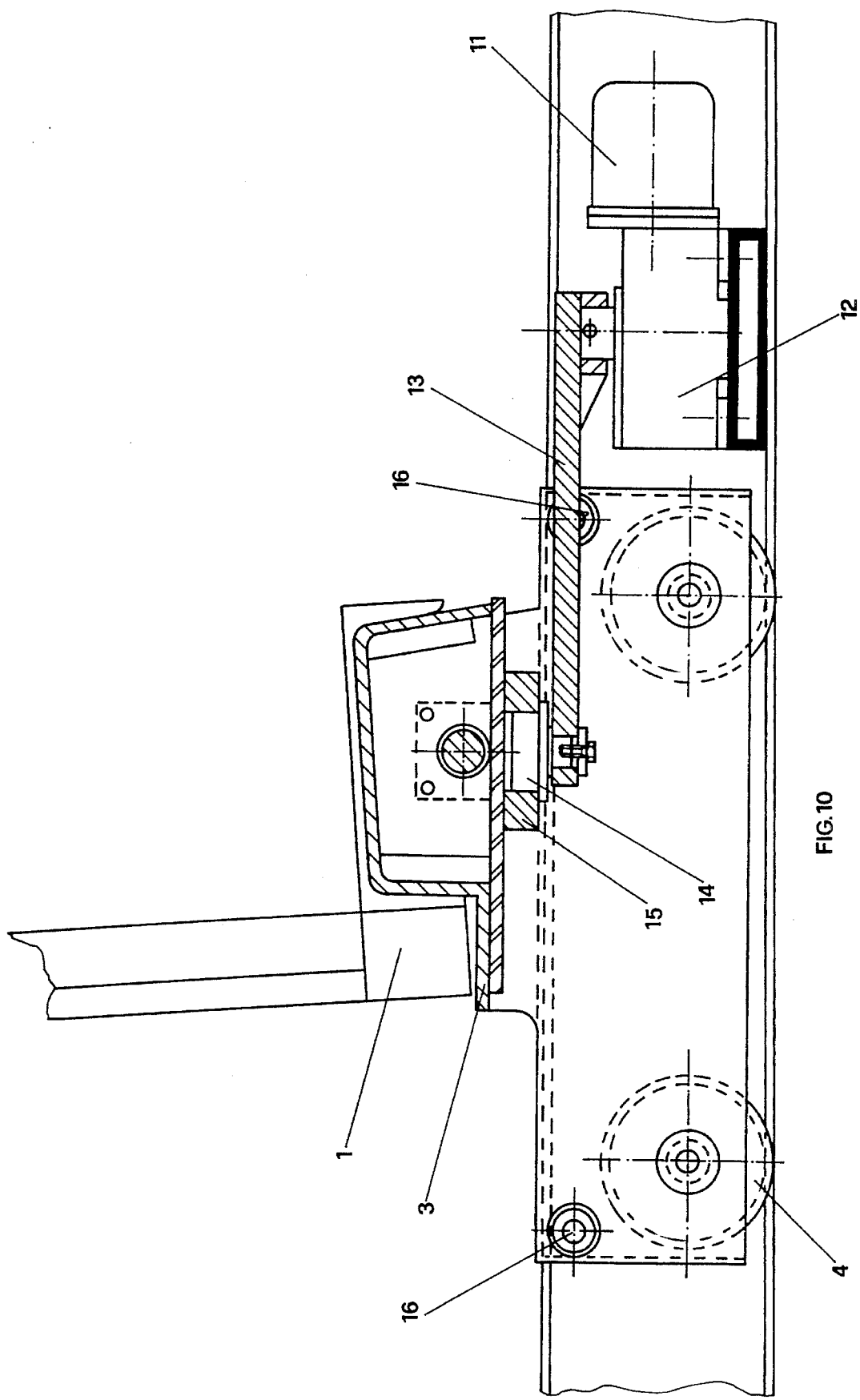
FIG. 10 is a cross section of FIG. 9 on an enlarged scale.

FIG. 10 is an enlarged view and shows the control motor (11) which actuates the reducing unit (12) and causes lever (13) to rotate. The latter provided with roller (14) which is engaged with guides (15), permits the displacement of carriage (3).

FIGS. 7, 8, and 10 show a device intended to prevent a turnover, the device consisting of eccentric pins 16 on which revolving rollers are keyed. The device avoids the turnover of a carriage 3 on which the frame is fixed when the latter operates in an inclined position.

Obviously other details of the storehouse may be varied not only with respect to the structure of the storage house but with respect to the control device which may be manual or motorized as stated herein above. All these variations are believed to fall within the scope of the present invention.

What is claimed is:

1. A storehouse for a plurality of articles, said storehouse comprising a plurality of movable frames (1), each frame comprising two vertical members connected by two horizontal members, said horizontal members being intrconnected by an additional plurality of vertical members, said additional plurality vertical members being located between said two vertical members, each frame having an adjacent frame, a supporting structure (2) for said frames disposed under said frames and comprised of two longitudinal parallel beams interconnected by two transverse beams wherein said beams form a single unitary body, said frames permitting the articles to be stored to rest on each said frame, mechanical means for moving each of said frames to carry out a motion transversally in a direction orthogonal with respect to said longitudinal supporting structure beams, whereby said articles resting on each of said frames may be removed from the storehouse by increasing the distance between each of said frames and the adjacent said frame thereof, wherein a group of frames, by carrying out said motion moves away from the remainder of said frames, each movable frame being fixed to a carriage (3), said carriage being provided with wheels (4), said wheels having an axis, each carriage being actuated by its own one of said mechanical means, each said carriage being rollably supported by said wheels on said supporting structure, said frames including all of said vertical members being arranged inclined with respect to said supporting structure.

2. The storehouse according to claim 1 wherein said frames rest on guides (6), a rack gear being disposed on said supporting structure, said mechanical means being motor means, said motor means increasing the distance of a group of said frames from the remainder of said frames, said guide (6) being toothed wheels, said motor means causing said toothed wheels to rotate and engage said rack gear to cause said frame motion.

3. The storehouse according to claim 1 wherein each said mechanical means comprises a piston and a hydraulic or pneumatic cylinder (10) respectively.

* * * * *